(12) United States Patent
Zhu et al.

(10) Patent No.: US 9,310,782 B2
(45) Date of Patent: Apr. 12, 2016

(54) METHOD FOR MEASURING DISPLACEMENT OF PLANAR MOTOR ROTOR

(71) Applicants: SHANGHAI MICRO ELECTRONICS EQUIPMENT CO., LTD., Shanghai (CN); TSINGHUA UNIVERSITY, Beijing (CN)

(72) Inventors: Yu Zhu, Beijing (CN); Jinchun Hu, Beijing (CN); Dengfeng Xu, Beijing (CN); Yuting Sun, Beijing (CN); Wensheng Yin, Beijing (CN); Ming Zhang, Beijing (CN); Kaiming Yang, Beijing (CN); Haihua Mu, Beijing (CN)

(73) Assignees: SHANGHAI MICRO ELECTRONICS EQUIPMENT CO., LTD., Shanghai (CN); TSINGHUA UNIVERSITY, Beijing (CN)

( * ) Notice: Subject to any disclaimer, the term of this patent is extended or adjusted under 35 U.S.C. 154(b) by 98 days.

(21) Appl. No.: 14/382,221

(22) PCT Filed: Feb. 21, 2013

(86) PCT No.: PCT/CN2013/071732
§ 371 (c)(1),
(2) Date: Aug. 29, 2014

(87) PCT Pub. No.: WO2013/127311
PCT Pub. Date: Sep. 6, 2013

(65) Prior Publication Data
US 2015/0097508 A1    Apr. 9, 2015

(30) Foreign Application Priority Data
Mar. 1, 2012 (CN) .......................... 2012 1 0052161

(51) Int. Cl.
*G05B 1/06* (2006.01)
*G05B 11/01* (2006.01)
(Continued)

(52) U.S. Cl.
CPC *G05B 6/02* (2013.01); *G01B 7/023* (2013.01); *G01B 7/14* (2013.01)

(58) Field of Classification Search
CPC ............ G03F 7/70758; G03F 7/70816; G03F 7/70725; G03F 7/70066; G03F 7/70716; G03F 7/70825; G03F 7/709; G03F 7/7035; G03F 7/70358; G03F 7/70708; G03F 7/70733; G03F 7/70783; H02K 41/03; H02K 2201/01
USPC ......... 318/119, 135, 560, 561, 562, 570–572, 318/652
See application file for complete search history.

(56) References Cited

U.S. PATENT DOCUMENTS 4,463,290 A * 7/1984 Asakawa ............... H02K 29/06
318/135

(Continued)

FOREIGN PATENT DOCUMENTS

| CN | 101660892 A | 3/2010 |
|---|---|---|
| CN | 101876557 A | 3/2010 |

(Continued)

OTHER PUBLICATIONS

International Search Report for PCT/CN2013/071732 filed on Feb. 21, 2013.

*Primary Examiner* — Paul Ip

(57) ABSTRACT

A method for measuring the displacement of a planar motor rotor. The measuring method comprises: four magnetic induction intensity sensors are distributed on the planar motor rotor; sampled signals of the four distributed sensors are processed to obtain signals $B_{sx}$, $B_{cx}$, $B_{sy}$ and $B_{cy}$ and magnetic field reference values $B_{ksx}$, $B_{kcx}$, $B_{ksy}$ and $B_{kcy}$; and X-direction displacement and Y-direction displacement can be measured respectively according to inequalities (I) and (II) by judgments, wherein $\Delta_x$ and $\Delta_y$ are X-direction displacement resolution and Y-direction displacement resolution respectively, and BM is the magnetic induction intensity amplitude of the magnetic field of said planar motor. The method provided by the invention is simple in calculation, can avoid calculation of a transcendental function and solve the quadrant judgment problem, is favorable to real-time high-speed operation and has a high engineering value.

$$\left| \frac{B_{ksx}B_{cx} - B_{kcx}B_{sx}}{B_M^2} \right| \geq \Delta_x \quad \text{(I)}$$

$$\left| \frac{B_{ksy}B_{cy} - B_{kcy}B_{sy}}{B_M^2} \right| \geq \Delta_y \quad \text{(II)}$$

3 Claims, 2 Drawing Sheets

(51) Int. Cl.
  *G05B 6/02* (2006.01)
  *G01B 7/02* (2006.01)
  *G01B 7/14* (2006.01)

(56) References Cited

U.S. PATENT DOCUMENTS

| | | | | |
|---|---|---|---|---|
| 4,509,001 A * | 4/1985 | Wakabayashi | ....... | G05B 19/231 318/135 |
| 4,958,115 A * | 9/1990 | Miller | .................... | H02K 29/06 310/12.17 |
| 5,760,500 A * | 6/1998 | Kondo | .................... | H02K 41/02 248/913 |
| 6,175,169 B1 * | 1/2001 | Hollis, Jr. | ............... | H02K 41/03 310/12.05 |
| 6,437,463 B1 * | 8/2002 | Hazelton | ............. | G03F 7/70716 310/12.06 |
| 6,646,721 B2 * | 11/2003 | Compter | ............. | G03F 7/70716 355/53 |
| 6,674,186 B2 * | 1/2004 | Yajima | .................... | H02K 41/03 310/12.17 |
| 6,777,896 B2 * | 8/2004 | Teng | ........................ | H02P 6/006 318/135 |
| 6,998,737 B2 * | 2/2006 | De Weerdt | ............. | H02K 41/03 310/12.07 |
| 7,148,590 B1 * | 12/2006 | Lampson | ............. | H02K 41/03 310/12.18 |
| 7,170,202 B2 * | 1/2007 | Watarai | .................. | H02K 41/03 310/12.25 |
| 7,205,741 B2 * | 4/2007 | Simons | ............... | G03F 7/70725 318/560 |
| 7,359,037 B2 * | 4/2008 | Carter | ................. | G03F 7/70066 355/71 |
| 7,372,548 B2 * | 5/2008 | Carter | ................. | G03F 7/70066 355/71 |
| 7,385,678 B2 * | 6/2008 | Dams | ..................... | G03B 27/58 310/12.06 |
| 7,468,589 B2 * | 12/2008 | Cox | ........................ | H02P 25/06 318/135 |
| RE41,232 E * | 4/2010 | Hazelton | ............. | G03F 7/70716 250/492.1 |
| 7,948,122 B2 * | 5/2011 | Compter | ............. | G03F 7/70758 310/12.06 |
| 8,008,815 B2 * | 8/2011 | Ro | ........................... | B23Q 1/62 310/12.05 |
| 8,070,145 B2 * | 12/2011 | Shibazaki | ........... | G03F 7/70758 269/8 |
| 8,102,513 B2 * | 1/2012 | Cox | ....................... | G03B 27/32 355/72 |
| 8,502,423 B2 * | 8/2013 | Shikayama | ........... | H02K 41/03 310/12.25 |
| 2002/0145722 A1 * | 10/2002 | Compter | ............. | G03F 7/70716 355/75 |
| 2002/0167230 A1 * | 11/2002 | Yajima | ................... | H02K 41/03 310/12.17 |
| 2003/0102721 A1 * | 6/2003 | Ueta | ..................... | G03F 7/70758 310/12.06 |
| 2004/0007920 A1 * | 1/2004 | Teng | ....................... | H02P 6/006 310/12.06 |
| 2005/0001579 A1 * | 1/2005 | Touzov | .................. | H02K 41/03 318/649 |
| 2005/0077786 A1 * | 4/2005 | De Weerdt | ............. | H02K 41/03 310/12.07 |
| 2005/0173991 A1 * | 8/2005 | Watarai | .................. | H02K 41/03 310/12.25 |
| 2005/0200830 A1 * | 9/2005 | Carter | ................. | G03F 7/70066 355/75 |
| 2005/0285550 A1 * | 12/2005 | Simons | ............... | G03F 7/70725 318/135 |
| 2006/0023195 A1 * | 2/2006 | Carter | ................. | G03F 7/70066 355/72 |
| 2006/0072098 A1 * | 4/2006 | Dams | ..................... | G03B 27/58 355/72 |
| 2007/0046913 A1 * | 3/2007 | Shibazaki | ........... | G03F 7/70758 355/30 |
| 2007/0164697 A1 * | 7/2007 | Cox | ........................ | H02P 25/06 318/701 |
| 2008/0203828 A1 * | 8/2008 | Compter | ............. | G03F 7/70758 310/12.06 |
| 2009/0056594 A1 * | 3/2009 | Ro | ........................... | B23Q 1/62 108/20 |
| 2009/0097003 A1 * | 4/2009 | Cox | ....................... | G03B 27/32 355/53 |
| 2012/0049657 A1 * | 3/2012 | Shikayama | ........... | H02K 41/03 310/12.25 |
| 2012/0055786 A1 * | 3/2012 | Shibazaki | ........... | G03F 7/70758 204/298.04 |
| 2012/0092641 A1 * | 4/2012 | Cox | ....................... | G03B 27/32 355/72 |
| 2013/0024157 A1 * | 1/2013 | Hu | ........................ | H02N 15/00 702/150 |
| 2013/0183627 A1 * | 7/2013 | Shibazaki | ............. | G03F 7/7035 430/325 |

FOREIGN PATENT DOCUMENTS

| | | |
|---|---|---|
| CN | 101769981 A | 7/2010 |
| CN | 102607391 A | 7/2012 |
| DE | 10 2007 021 231 A1 | 11/2007 |
| EP | 0 726 448 A1 | 8/1996 |
| JP | H08-6642 A | 1/1996 |
| JP | H09-91043 A | 4/1997 |
| JP | 2003-121128 A | 4/2003 |

* cited by examiner

METHOD FOR MEASURING DISPLACEMENT OF PLANAR MOTOR ROTOR

TECHNICAL FIELD

The present invention relates to a displacement measuring method for a motor, which is especially suitable for analyzing the magnetic field signals of the planar motor and enabling fine displacement detection of the planar motor.

BACKGROUND ART

The rotary motor may provide a driving power which can be converted to a planar movement by a mechanism. The mechanism is usually complex and the precision and speed of its transmission are limited for this, which is disadvantageous along with other problems such as frequent calibration, high cost, poor reliability and too big size. The early planar motor is operated by two planar type motors which are directly driven, which structure increases the complexity of the transmission system. In contrast, the planar motor, which can directly utilize electro-magnetic energy to drive the planar movement, has advantages of high concentration of force, low dissipation of heat and high precision etc, thus the intermediate transmitting device is saved which was used for converting a rotary movement into a planar movement and into another planar movement. And it becomes possible to integrate the object being controlled with the motor which has advantages such as quick response, good sensitivity, good servo control and simple structure.

Signal subdivision has a wide applicability in the fields of machinery and electronics. The magnetic field signals of the planar motor are distributed periodically, and when the signal varies in the one period, a fixed spatial displacement occurs correspondingly. Usually, the measurement circuit performs the measurement for the displacement by counting periods of the signal. When only counting the periods is performed, apparently, the resolution is the displacement corresponding to the one period of the signal. Thus, in order to improve the resolution of the instrument, subdivision must be required.

SUMMARY OF THE INVENTION

One goal of the present invention is to provide a method for measuring the displacement of the rotor of a planar motor, to measure relative displacements of the rotor and stator of the planar motor in X and Y directions and enable high subdivision of the signal and simple and quick signal processing.

To achieve the above-mentioned goal, the technical solution provided by the invention is as follows:

1) a magnetic field is generated by a magnetic steel array on the stator of a planar motor and four magnetic induction intensity sensors are disposed on the rotor of a planar motor, the coordinates of the first sensor are $(X_1, Y_1)$, the coordinates of the second sensor are $(X_3, Y_1)$, the coordinates of the third sensor are $(X_2, Y_2)$ and the coordinates of the fourth sensor are $(X_4, Y_2)$; the sampled signals of the first sensor, the second sensor, the third sensor and the fourth sensor are $B_a$, $B_b$, $B_c$ and $B_d$, and the sampled signals $B_a$, $B_b$, $B_c$ and $B_d$ are processed in a signal processing circuit, wherein, the X-direction coordinates $X_1$, $X_2$, $X_3$ and $X_4$ are spaced apart from each other sequentially by a distance of one fourth of the X-direction magnetic field pitch $\tau_x$ of the planar motor, and the Y-direction coordinates $Y_1$ and $Y_2$ are spaced apart from each other by a distance of one fourth of the Y-direction magnetic field pitch $\tau_y$ of the planar motor;

2) supposing the X-direction displacement resolution as $\Delta x$, and the Y-direction displacement resolution as $\Delta y$, the magnitude of the magnetic induction intensity of the magnetic field generated by the magnetic steel array is measured as $B_M$, the X-direction counting unit is initialized to be $n_x=0$, the Y-direction counting unit is initialized to be $n_y=0$, the X-direction magnetic field reference values are initialized to be $$B_{ksx} = \frac{B_{a0} - B_{b0}}{2}, B_{kcx} = \frac{B_{c0} - B_{d0}}{2},$$

and the Y-direction magnetic field reference values are initialized to be $$B_{ksy} = \frac{B_{a0} + B_{b0}}{2}, B_{kcy} = \frac{B_{c0} + B_{d0}}{2},$$

wherein, $B_{a0}$, $B_{b0}$, $B_{c0}$ and $B_{d0}$ are respectively the sampled signals from the first sensor, the second sensor, the third sensor and the fourth sensor when the rotor of the planar motor is at the initial position;

3) the measurement starts, the sampled signals $B_a$, $B_b$, $B_c$ and $B_d$ of the first sensor, the second sensor, the third sensor and the fourth sensor are obtained by sampling, and the sampled signals $B_a$, $B_b$, $B_c$ and $B_d$ are processed in the signal processing circuit to obtain four signals $B_{sx}$, $B_{cx}$, $B_{sy}$ and $B_{cy}$, wherein $$B_{sx} = \frac{B_a - B_b}{2}, B_{cx} = \frac{B_c - B_d}{2}, B_{sy} = \frac{B_a + B_b}{2}, B_{cy} = \frac{B_c + B_d}{2};$$

4) it is determined by the signal processing circuit that whether the X-direction displacement is generated and whether the Y-direction displacement is generated, a. if the X-direction displacement is generated, then whether the X-direction displacement is forward or backward is needed to be determined further, and if the generated X-direction displacement has a forward direction, then the X-direction counting unit performs $n_x=n_x+1$, and if the generated X-direction displacement has a backward direction, then the X-direction counting unit performs $n_x=n_x-1$, and the X-direction magnetic field reference values are updated to $B_{ksx}=B_{sx}$, $B_{kcx}=B_{cx}$; thus the X-direction displacement measurement is completed;

if the X-direction displacement is not generated, then the X-direction displacement measurement is completed directly;

b. if the Y-direction displacement is generated, then whether the Y-direction displacement is forward or backward is needed to be determined further, and if the generated Y-direction displacement has a forward direction, then the Y-direction counting unit performs $n_y=n_y+1$, if the generated Y-direction displacement has a backward direction, then the Y-direction counting unit performs $n_y=n_y-1$, and the Y-direction magnetic field reference values are updated to $B_{ksy}=B_{sy}$, $B_{kcy}=B_{cy}$, and the Y-direction displacement measurement is completed;

if the Y-direction displacement is not generated, then the Y-direction displacement measurement is completed directly;

5) when the X-direction displacement measurement and the Y-direction displacement measurement are both completed, the X-direction relative displacement of the rotor of the planar motor is calculated as $x=n_x \cdot \Delta x$, and the Y-direction relative displacement is calculated as $y=n_y \cdot \Delta y$; and 6) the steps 3) to 5) are repeated to enable the real-time measurement for the displacement of the rotor of the planar motor.

In the above-mentioned technical solution, it is characterized in that, whether the X-direction displacement is generated and whether the X-direction displacement is forward or backward determined in the step 4) are performed as follows, if $$\left| \frac{B_{ksx}B_{cx} - B_{kcx}B_{sx}}{B_M^2} \right| \geq \Delta_x,$$

then the relative displacement of the rotor of the planar motor in the X-direction is $\Delta x$; and if not, then it is considered that the relative displacement in the X-direction is not generated by the rotor of the planar motor;

if $B_{ksx}B_{cx} - B_{kcx}B_{sx} \geq 0$, then the relative displacement of the rotor of the planar motor in the X-direction is in the forward direction; and if not, then the relative displacement of the rotor of the planar motor in the X-direction is in the backward direction.

In the above-mentioned technical solution, it is characterized in that, whether the Y-direction displacement is generated and whether the Y-direction displacement is forward or backward determined in the step 4) are performed as follows, if $$\left| \frac{B_{ksy}B_{cy} - B_{kcy}B_{sy}}{B_M^2} \right| \geq \Delta_y,$$

then the relative displacement of the rotor of the planar motor in the Y-direction is $\Delta y$; and if not, then it is considered that the relative displacement in the Y-direction is not generated by the rotor of the planar motor;

if $B_{ksy}B_{cy} - B_{kcy}B_{sy} \geq 0$, then the relative displacement of the rotor of the planar motor in the Y-direction is in the forward direction; and if not, then the relative displacement of the rotor of the planar motor in the Y-direction is in the backward direction.

The technical solution provided by the present invention is advantageous in various aspects, that is, the relative displacement of the rotor to the stator in the motor is measured by directly taking the magnetic field in the motor itself as a detection signal for the displacement. In this way, various disadvantages can be avoided such as difficulty in installing the sensors, and the resolution of the measuring system is improved to enable a high subdivision. And the calculations of transcendental functions and quadrant determination are avoided which is good for real-time high speed operation and has a higher engineering value.

In which, 1—stator of planar motor; 2—magnetic steel array; 3—rotor of planar motor; 4—first sensor; 5—second sensor; 6—third sensor; 7—fourth sensor; 8—signal processing circuit.

DETAILED DESCRIPTION OF THE EMBODIMENTS

In the following, taking a moving-coil type planar motor as an example, the method for measuring the displacement of the rotor of the planar motor of the invention is illustrated in connection with the drawings and embodiments.

Figure 1:
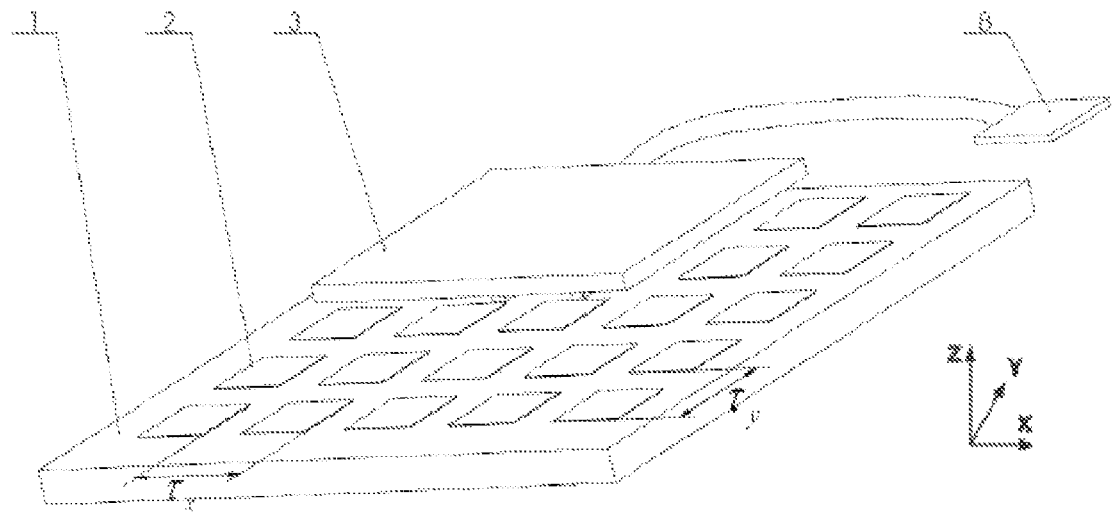
FIG. 1 is an overall structural schematic diagram showing the method for measuring the displacement of the rotor of a planar motor applied to a moving-coil type planar motor according to the present invention.
Figure 2:
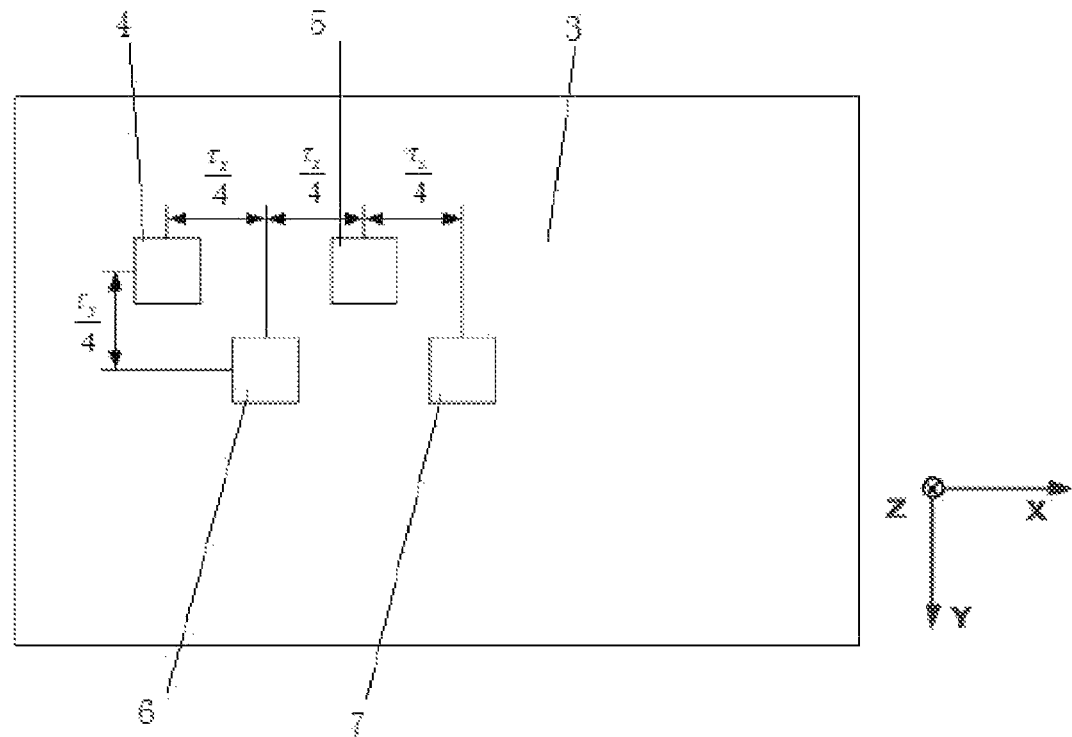
FIG. 2 is a schematic diagram showing the positions where a first sensor, a second sensor, a third sensor and a fourth sensor are installed on the rotor of a planar motor.

Referring to FIGS. 1 and 2, a sensor arrangement is shown in which the method for measuring the displacement of the rotor is applied to a moving-coil type planar motor. A magnetic field $B=B_M(\sin x + \sin y)$ is generated by a magnetic steel array 2 on a stator 1 of a planar motor, wherein, $B_M$ is the magnitude of the magnetic induction intensity of the magnetic field B generated by the magnetic steel array 2, x is the X-direction displacement of the rotor of the planar motor, and y is the Y-direction displacement of the rotor of the planar motor. Four magnetic induction intensity sensors are disposed on the rotor 3 of the planar motor, the coordinates of the first sensor 4 are $(X_1, Y_1)$, the coordinates of the second sensor 5 are $(X_3, Y_1)$, the coordinates of the third sensor 6 are $(X_2, Y_2)$ and the coordinates of the fourth sensor 7 are $(X_4, Y_2)$, the sampled signals of the first sensor, the second sensor, the third sensor and the fourth sensor are $B_a$, $B_b$, $B_c$ and $B_d$ respectively, and the sampled signals $B_a$, $B_b$, $B_c$ and $B_d$ are processed in a signal processing circuit 8, wherein, the X-direction coordinates $X_1$, $X_2$, $X_3$ and $X_4$ are spaced apart from each other sequentially by a distance of one fourth of the X-direction magnetic field pitch $\tau_x$ of the planar motor, and the Y-direction coordinates $Y_1$ and $Y_2$ are spaced apart from each other by a distance of one fourth of the Y-direction magnetic field pitch $\tau_y$ of the planar motor.

Figure 3:
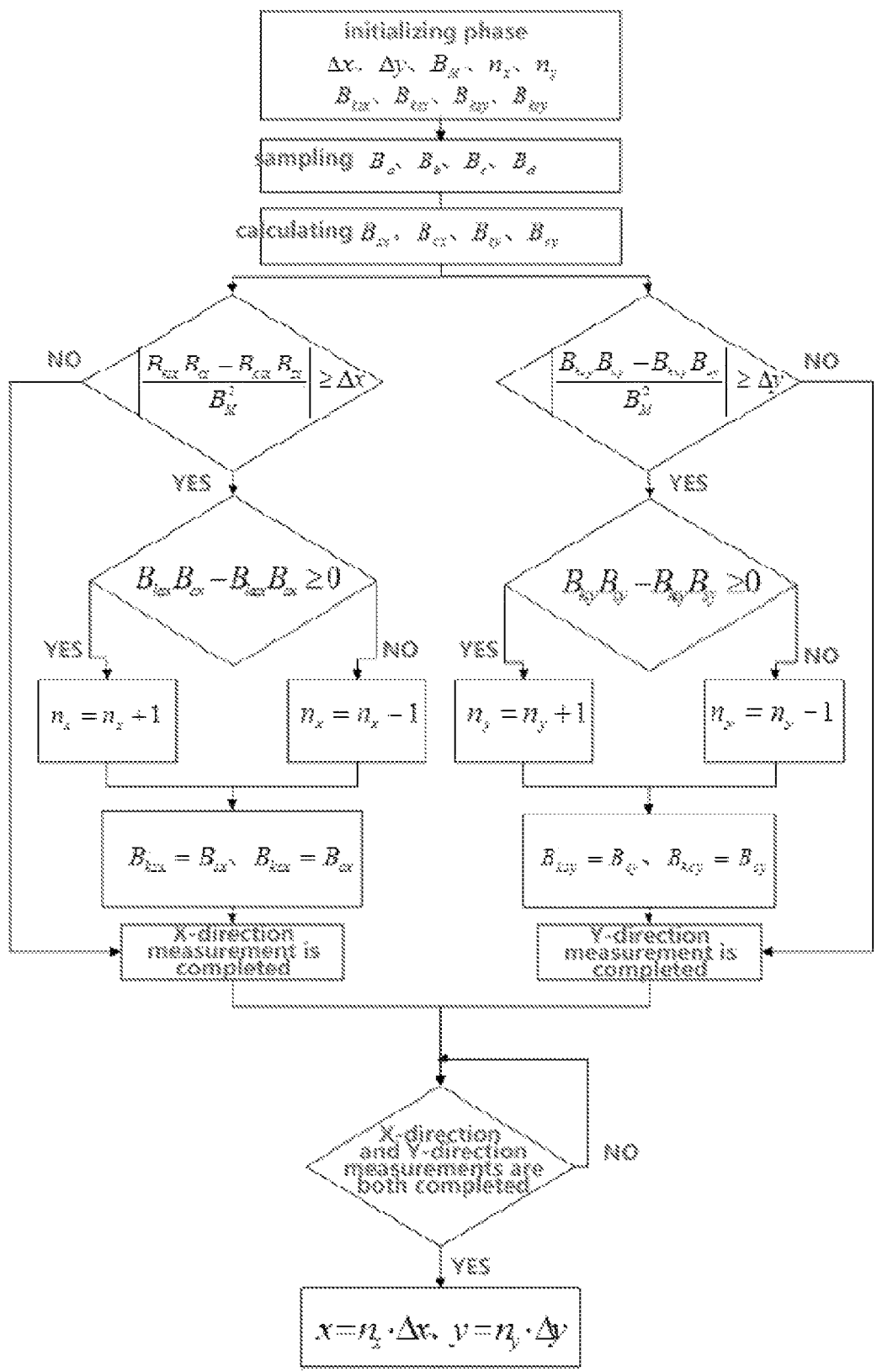
FIG. 3 is a flowchart showing the method for measuring the displacement of the rotor of a planar motor according to the present invention.

FIG. 3 is a flowchart for measuring the displacement of the rotor of the planar motor according to the present invention. According to the above-mentioned sensor arrangement, the sampled signals $B_a$, $B_b$, $B_c$ and $B_d$ of the first sensor, the second sensor, the third sensor and the fourth sensor are respectively $$B_a = B_M(\sin x + \sin y) \tag{1}$$

$$B_b = B_M(-\sin x + \sin y) \tag{2}$$

$$B_c = B_M(\cos x + \cos y) \tag{3}$$

$$B_d = B_M(-\cos x + \cos y) \tag{4}$$

The $B_a$, $B_b$, $B_c$ and $B_d$ are processed respectively to obtain four signals $B_{sx}$, $B_{cx}$, $B_{sy}$ and $B_{cy}$, wherein $$B_{sx} = \frac{B_a - B_b}{2},\ B_{cx} = \frac{B_c - B_d}{2},\ B_{sy} = \frac{B_a + B_b}{2},\ B_{cy} = \frac{B_c + B_d}{2}.$$

Suppose $B_{sx}$, $B_{cx}$, $B_{sy}$ and $B_{cy}$ at the time i as $B_{isx}$, $B_{icx}$, $B_{isy}$ and $B_{icy}$ respectively. According to the equations (1), (2), (3) and (4), and the definitions of $B_{sx}$, $B_{cx}$, $B_{sy}$ and $B_{cy}$, $B_{isx}$, $B_{icx}$, $B_{isy}$ and $B_{icy}$ can be obtained as follows:

$$B_{isx} = B_M \sin x \tag{5}$$

$$B_{icx} = B_M \cos x \tag{6}$$

$$B_{isy}=B_M \sin y \quad (7)$$

$$B_{icy}=B_M \cos y \quad (8)$$

Suppose $B_{sx}$, $B_{cx}$, $B_{sy}$ and $B_{cy}$ at the time i+1 as $B_{(i+1)sx}$, $B_{(i+1)cx}$, $B_{(i+1)sy}$ and $B_{(i+1)cy}$ respectively. According to the equations (1), (2), (3) and (4), when the X-direction relative displacement $\Delta_x$ of the rotor of the planar motor occurred from the time i to i+1 and the Y-direction relative displacement $\Delta_y$ of the rotor of the planar motor occurred from the time i to i+1 are very small, then $B_{(i+1)sx}$, $B_{(i+1)cx}$, $B_{(i+1)sy}$ and $B_{(i+1)cy}$ are approximated as follows:

$$B_{(i+1)sx}=B_M \sin(x+\Delta_x) \approx B_M(\sin x + \Delta_x \cos x) \quad (9)$$

$$B_{(i+1)cx}=B_M \cos(x+\Delta_x) \approx B_M(\cos x - \Delta_x \sin x) \quad (10)$$

$$B_{(i+1)sy}=B_M \sin(y+\Delta_y) \approx B_M(\sin y + \Delta_y \cos y) \quad (11)$$

$$B_{(i+2)cy}=B_M \cos(y+\Delta_y) \approx B_M(\cos y - \Delta_y \sin y) \quad (12)$$

The equations (5) to (12) are calculated to obtain:

$$\left|\frac{B_{(i+1)sx}B_{icx} - B_{(i+1)cx}B_{isx}}{B_M^2}\right| \approx \Delta_x \quad (13)$$

$$\left|\frac{B_{(i+1)sy}B_{icy} - B_{(i+1)cy}B_{isy}}{B_M^2}\right| \approx \Delta_y \quad (14)$$

In the application of the real-time measurement for the displacement of the rotor of the planar motor, the left parts of the equations (13) and (14) are calculated from the sampled signals of the first sensor, the second sensor, the third sensor and the fourth sensor; and $\Delta x$ and $\Delta y$ are the X-direction displacement resolution and the Y-direction displacement resolution respectively which are set at initialization. During the real-time measurement, whether $$\left|\frac{B_{(i+1)sx}B_{icx} - B_{(i+1)cx}B_{isx}}{B_M^2}\right| \geq \Delta_x$$

and whether $$\left|\frac{B_{(i+1)sy}B_{icy} - B_{(i+1)cy}B_{isy}}{B_M^2}\right| \geq \Delta_y$$

are determined respectively and simultaneously. If $$\left|\frac{B_{(i+1)sx}B_{icx} - B_{(i+1)cx}B_{isx}}{B_M^2}\right| \geq \Delta_x,$$

then it is considered that the X-direction displacement generated by the rotor is $\Delta x$; if not, then it is considered that the X-direction displacement generated by the rotor is less than $\Delta x$. If $$\left|\frac{B_{(i+1)sy}B_{icy} - B_{(i+1)cy}B_{isy}}{B_M^2}\right| \geq \Delta_y,$$

then it is considered that the Y-direction displacement generated by the rotor is $\Delta y$; if not, then it is considered that the Y-direction displacement generated by the rotor is less than $\Delta y$.

If it is considered that the X-direction displacement is generated by the rotor, then the direction of displacement $\Delta x$ is needed to be determined further; if $B_{(i+1)sx}B_{icx}-B_{(i+1)cx}B_{isx} \geq 0$, then it is considered the direction of displacement $\Delta x$ is the forward direction, and at the same time, the X-direction counting unit performs $n_x=n_x+1$; and if $B_{(i+1)sx}B_{icx}-B_{(i+1)cx}B_{isx}<0$, then it is considered that the direction of displacement $\Delta x$ is the backward direction, and at the same time, the X-direction counting unit performs $n_x=n_x-1$.

If it is considered that the Y-direction displacement is generated by the rotor, then the direction of displacement $\Delta y$ is needed to be determined further; if $B_{(i+1)sy}B_{icy}-B_{(i+1)cy}B_{isy} \geq 0$, then it is considered that the direction of displacement $\Delta y$ is the forward direction, and at the same time, the Y-direction counting unit performs $n_y=n_y+1$; and if $B_{(i+1)sy}B_{icy}-B_{(i+1)cy}B_{isy}<0$, then it is considered that the direction of displacement $\Delta y$ is the backward direction, and at the same time, the Y-direction counting unit performs $n_y=n_y-1$.

When the X-direction displacement measurement and the Y-direction displacement measurement are both completed, the X-direction relative displacement of the rotor is calculated as $x=n_x \cdot \Delta x$, and the Y-direction relative displacement is calculated as $y=n_y \cdot \Delta y$.

Additionally, the present invention provides a method for measuring the displacement of the rotor of a planar motor, the method comprising the following steps, 1) a magnetic field is generated by a magnetic steel array 2 on a stator 1 of a planar motor and four magnetic induction intensity sensors are disposed on a rotor 3 of the planar motor, the coordinates of the first sensor 4 are $(X_1, Y_1)$, the coordinates of the second sensor 5 are $(X_3, Y_1)$, the coordinates of the third sensor 6 are $(X_2, Y_2)$ and the coordinates of the fourth sensor 7 are $(X_4, Y_2)$, the sampled signals of the first sensor, the second sensor, the third sensor and the fourth sensor are $B_a$, $B_b$, $B_c$ and $B_d$ respectively, and the sampled signals $B_a$, $B_b$, $B_c$ and $B_d$ are processed in a signal processing circuit 8, wherein, the X-direction coordinates $X_1$, $X_2$, $X_3$ and $X_4$ are spaced apart from each other sequentially by a distance of one fourth of the X-direction magnetic field pitch $\tau_x$ of the planar motor and the Y-direction coordinates $Y_1$ and $Y_2$ are spaced apart from each other by a distance of one fourth of the Y-direction magnetic field pitch $\tau_y$ of the planar motor;

2) supposing the X-direction displacement resolution as $\Delta x$, and the Y-direction displacement resolution as $\Delta y$, the magnitude of the magnetic induction intensity of the magnetic field generated by the magnetic steel array 2 is measured as $B_M$, the X-direction counting unit is initialized to be $n_x=0$, the Y-direction counting unit is initialized to be $n_y=0$, the X-direction magnetic field reference values are initialized to be $$B_{ksx} = \frac{B_{a0} - B_{b0}}{2}, \quad B_{kcx} = \frac{B_{c0} - B_{d0}}{2},$$

and the Y-direction magnetic field reference values are initialized to be $$B_{ksy} = \frac{B_{a0} + B_{b0}}{2}, \quad B_{kcy} = \frac{B_{c0} + B_{d0}}{2},$$

wherein, $B_{a0}$, $B_{b0}$, $B_{c0}$ and $B_{d0}$ are respectively the sampled signals from the first sensor, the second sensor, the third sensor and the fourth sensor when the rotor of the planar motor is at the initial position;

3) the measurement starts, the sampled signals $B_a$, $B_b$, $B_c$ and $B_d$ of the first sensor 4, the second sensor 5, the third sensor 6 and the fourth sensor 7 are obtained by sampling, and the sampled signals $B_a$, $B_b$, $B_c$ and $B_d$ are processed in the signal processing circuit 8 to obtain four signals $B_{sx}$, $B_{cx}$, $B_{sy}$ and $B_{cy}$, wherein $$B_{sx} = \frac{B_a - B_b}{2}, B_{cx} = \frac{B_c - B_d}{2}, B_{sy} = \frac{B_a + B_b}{2}, B_{cy} = \frac{B_c + B_d}{2};$$

4) it is determined by the signal processing circuit 8 whether the X-direction displacement is generated and whether the Y-direction displacement is generated, a. if the X-direction displacement is generated, then whether the X-direction displacement is forward or backward is needed to be determined further; and if the generated X-direction displacement has a forward direction, then the X-direction counting unit performs $n_x = n_x + 1$; if the generated X-direction displacement has a backward direction, then the X-direction counting unit performs $n_x = n_x - 1$, and the X-direction magnetic field reference values are updated to $B_{ksx} = B_{sx}$, $B_{kcx} = B_{cx}$; thus the X-direction displacement measurement is completed;

if the X-direction displacement is not generated, then the X-direction displacement measurement is completed directly;

b. if the Y-direction displacement is generated, then whether the Y-direction displacement is forward or backward is needed to be determined further, and if the generated Y-direction displacement has a forward direction, then the Y-direction counting unit performs $n_y = n_y + 1$, if the generated Y-direction displacement has a backward direction, then the Y-direction counting unit performs $n_y = n_y - 1$, and the Y-direction magnetic field reference values are updated to $B_{ksy} = B_{sy}$, $B_{kcy} = B_{cy}$; thus the Y-direction displacement measurement is completed;

if the Y-direction displacement is not generated, then the Y-direction displacement measurement is completed directly;

5) when the X-direction displacement measurement and the Y-direction displacement measurement are both completed, the X-direction relative displacement of the rotor is calculated as $x = n_x \cdot \Delta x$, and the Y-direction relative displacement is calculated as $y = n_y \cdot \Delta y$; and 6) the steps 3) to 5) are repeated to enable the real-time measurement for the displacement of the rotor of the planar motor.

In the above-mentioned technical solution, it is characterized in that, whether the X-direction displacement is generated and whether the X-direction displacement is forward or backward determined in the step 4) are performed as follows, if $$\left| \frac{B_{ksx} B_{cx} - B_{kcx} B_{sx}}{B_M^2} \right| \geq \Delta_x,$$

then the relative displacement of the rotor in the X-direction is $\Delta x$; and if not, then it is considered that the relative displacement in the X-direction is not generated by the rotor;

if $B_{ksx} B_{cx} - B_{kcx} B_{sx} \geq 0$, then the relative displacement of the rotor in the X-direction is in the forward direction; and if not, then the relative displacement of the rotor in the X-direction is in the backward direction.

In the above-mentioned technical solution, it is characterized in that, whether the Y-direction displacement is generated and whether the Y-direction displacement is forward or backward determined in the step 4) are performed as follows, if $$\left| \frac{B_{ksy} B_{cy} - B_{kcy} B_{sy}}{B_M^2} \right| \geq \Delta_y,$$

then the relative displacement of the rotor in the Y-direction is $\Delta y$; and if not, then it is considered that the relative displacement in the Y-direction is not generated by the rotor;

if $B_{ksy} B_{cy} - B_{kcy} B_{sy} \geq 0$, then the relative displacement of the rotor in the Y-direction is in the forward direction; and if not, then the relative displacement of the rotor in the Y-direction is in the backward direction.

Embodiment

The said magnetic field pitch $\tau_x = \tau_y = 35.35$ mm, the said X-direction displacement resolution $\Delta x = 15$ μm, the said Y-direction displacement resolution $\Delta y = 15$ μm, and the magnitude of the magnetic induction intensity of the magnetic field generated by the magnetic steel array is measured as $B_M = 80$ mT.

1) a magnetic field is generated by a magnetic steel array 2 on the stator 1 of a planar motor and four magnetic induction intensity sensors are disposed on the rotor 3 of the planar motor; the coordinates of the first sensor 4 are $(X_1, Y_1)$, the coordinates of the second sensor 5 are $(X_3, Y_1)$, the coordinates of the third sensor 6 are $(X_2, Y_2)$ and the coordinates of the fourth sensor 7 are $(X_4, Y_2)$, the sampled signals of the first sensor, the second sensor, the third sensor and the fourth sensor are $B_a$, $B_b$, $B_c$ and $B_d$, respectively, and the sampled signals $B_a$, $B_b$, $B_c$ and $B_d$ are processed in a signal processing circuit 8, wherein, the X-direction coordinates $X_1$, $X_2$, $X_3$ and $X_4$ are spaced apart from each other sequentially by a distance of 8.8375 mm, and the Y-direction coordinates $Y_1$ and $Y_2$ are spaced apart from each other by a distance of 8.8375 mm;

2) supposing the X-direction displacement resolution as $\Delta x = 15$ μm, the Y-direction displacement resolution as $\Delta y = 15$ μm, the magnitude of the magnetic induction intensity of the magnetic field generated by the magnetic steel array 2 is measured as $B_M = 80$ mT, the X-direction counting unit is initialized to be $n_x = 0$, the Y-direction counting unit is initialized to be $n_y = 0$, the X-direction magnetic field reference values are initialized to be $$B_{ksx} = \frac{B_{a0} - B_{b0}}{2}, B_{kcx} = \frac{B_{c0} - B_{d0}}{2},$$

and the Y-direction magnetic field reference values are initialized to be $$B_{ksy} = \frac{B_{a0} + B_{b0}}{2}, B_{kcy} = \frac{B_{c0} + B_{d0}}{2},$$

wherein, $B_{a0}$, $B_{b0}$, $B_{c0}$ and $B_{d0}$ are respectively the sampled signals from the first sensor, the second sensor, the third sensor and the fourth sensor when the rotor of the planar motor is at the initial position;

3) the measurement starts, the sampled signals $B_a$, $B_b$, $B_c$ and $B_d$ of the first sensor 4, the second sensor 5, the third sensor 6 and the fourth sensor 7 are obtained by sampling, and the sampled signals $B_a$, $B_b$, $B_c$ and $B_d$ are processed in the signal processing circuit 8 to obtain four signals $B_{sx}$, $B_{cx}$, $B_{sy}$ and $B_{cy}$, wherein $$B_{sx} = \frac{B_a - B_b}{2}, B_{cx} = \frac{B_c - B_d}{2}, B_{sy} = \frac{B_a + B_b}{2}, B_{cy} = \frac{B_c + B_d}{2};$$

4) it is determined by the signal processing circuit 8 whether the X-direction displacement is generated and whether the Y-direction displacement is generated,
 a. if $$\left| \frac{B_{ksx} B_{cx} - B_{kcx} B_{sx}}{6400} \right| \geq 15,$$

then the relative displacement of the planar motor in the X-direction is 15 µm, and whether the X-direction displacement is forward or backward is determined further, if $B_{ksx}B_{cx}-B_{kcx}B_{sx} \geq 0$, then the X-direction displacement is in the forward direction, and the X-direction counting unit performs $n_x=n_x+1$, and if $B_{ksx}B_{cx}-B_{kcx}B_{sx}<0$, then the X-direction displacement is in the backward direction, and the X-direction counting unit performs $n_x=n_x-1$, and the X-direction magnetic field reference values are updated to $B_{ksx}=B_{sx}$, $B_{kcx}=B_{cx}$; thus the X-direction displacement measurement is completed;
 if $$\left| \frac{B_{ksx} B_{cx} - B_{kcx} B_{sx}}{6400} \right| < 15,$$

then the X-direction displacement measurement is completed directly;
 b. if $$\left| \frac{B_{ksy} B_{cy} - B_{kcy} B_{sy}}{6400} \right| \geq 15,$$

then the relative displacement of the planar motor in the Y-direction is 15 µm, and whether the Y-direction displacement is forward or backward is determined further, if $B_{ksy}B_{cy}-B_{kcy}B_{sy} \geq 0$, then the Y-direction displacement is in the forward direction, and the Y-direction counting unit performs $n_y=n_y+1$, and if $B_{ksy}B_{cy}-B_{kcy}B_{sy}<0$, then the Y-direction displacement is in the backward direction, and the Y-direction counting unit performs $n_y=n_y-1$, and the Y-direction magnetic field reference values are updated to $B_{ksy}=B_{sy}$, $B_{kcy}=B_{cy}$; thus the Y-direction displacement measurement is completed;
 if $$\left| \frac{B_{ksy} B_{cy} - B_{kcy} B_{sy}}{6400} \right| \geq 15 < 15,$$

then the Y-direction displacement measurement is completed directly;

5) when the X-direction displacement measurement and the Y-direction displacement measurement are both completed, the X-direction relative displacement of the rotor is calculated as $x=15*n_x$, and the Y-direction relative displacement is calculated as $y=15*n_y$; and 6) the steps 3) to 5) are repeated to enable the real-time measurement for the displacement of the rotor of the planar motor.

Through the above-mentioned steps, a method for measuring the displacement of the rotor of the planar motor is provided, the relative displacements of the rotor and the stator in the X-direction and the Y-direction are measured respectively, enabling high subdivision to signals and simple and fast processing for signals.

The invention claimed is:
1. A method for measuring the displacement of a rotor of a planar motor, characterized in that, the said method comprising:
 1) a magnetic field is generated by a magnetic steel array (2) on a stator (1) of the planar motor and four magnetic induction intensity sensors are disposed on a rotor (3) of the planar motor; the coordinates of the first sensor (4) are $(X_1, Y_1)$, the coordinates of the second sensor (5) are $(X_3, Y_1)$, the coordinates of the third sensor (6) are $(X_2, Y_2)$ and the coordinates of the fourth sensor (7) are $(X_4, Y_2)$; the sampled signals of the first sensor, the second sensor, the third sensor and the fourth sensor are $B_a$, $B_b$, $B_c$ and $B_d$ respectively and the sampled signals $B_a$, $B_b$, $B_c$ and $B_d$ are processed in a signal processing circuit (8), wherein, the X-direction coordinates $X_1$, $X_2$, $X_3$ and $X_4$ are spaced apart from each other sequentially by a distance of one fourth of the X-direction magnetic field pitch $\tau_x$ of the planar motor, and the Y-direction coordinates $Y_1$ and $Y_2$ are spaced apart from each other by a distance of one fourth of the Y-direction magnetic field pitch $\tau_y$ of the planar motor;
 2) supposing the X-direction displacement resolution as $\Delta x$ and the Y-direction displacement resolution as $\Delta y$, the magnitude of the magnetic induction intensity of the magnetic field generated by the magnetic steel array (2) is measured as $B_M$, the X-direction counting unit is initialized to be $n_x=0$, the Y-direction counting unit is initialized to be $n_y=0$, the X-direction magnetic field reference values are initialized to be

$$B_{ksx} = \frac{B_{a0} - B_{b0}}{2}, B_{kcx} = \frac{B_{c0} - B_{d0}}{2},$$

and the Y-direction magnetic field reference values are initialized to be $$B_{ksy} = \frac{B_{a0} + B_{b0}}{2}, B_{kcy} = \frac{B_{c0} + B_{d0}}{2},$$

wherein $B_{a0}$, $B_{b0}$, $B_{c0}$ and $B_{d0}$ are respectively the sampled signals from the first sensor, the second sensor, the third sensor and the fourth sensor when the rotor of the planar motor is at the initial position;
 3) the measurement starts, and the sampled signals $B_a$, $B_b$, $B_c$ and $B_d$ of the first sensor (4), the second sensor (5), the third sensor (6) and the fourth sensor (7) are obtained by sampling, and the sampled signals $B_a$, $B_b$, $B_c$ and $B_d$ are processed in the signal processing circuit (8) to obtain four signals $B_{sx}$, $B_{cx}$, $B_{sy}$ and $B_{cy}$, wherein $$B_{sx} = \frac{B_a - B_b}{2}, B_{cx} = \frac{B_c - B_d}{2}, B_{sy} = \frac{B_a + B_b}{2}, B_{cy} = \frac{B_c + B_d}{2};$$

4) it is determined by the signal processing circuit (8) whether the X-direction displacement is generated and whether the Y-direction displacement is generated, a. if the X-direction displacement is generated, then whether the X-direction displacement is forward or backward is needed to be determined further; and if the generated X-direction displacement has a forward direction, then the X-direction counting unit performs $n_x=n_x+1$, and if the generated X-direction displacement has a backward direction, then the X-direction counting unit performs $n_x=n_x-1$; and the X-direction magnetic field reference values are updated to $B_{ksx}=B_{sx}$, $B_{kcx}=B_{cx}$; thus the X-direction displacement measurement is completed;

if the X-direction displacement is not generated, then the X-direction displacement measurement is completed directly; and b. if the Y-direction displacement is generated, then whether the Y-direction displacement is forward or backward is needed to be determined further; and if the generated Y-direction displacement has a forward direction, then the Y-direction counting unit performs $n_y=n_y+1$, and if the generated Y-direction displacement has a backward direction, then the Y-direction counting unit performs $n_y=n_y-1$; and the Y-direction magnetic field reference values are updated to $B_{ksy}=B_{sy}$, $B_{kcy}=B_{cy}$; thus the Y-direction displacement measurement is completed;

if the Y-direction displacement is not generated, then the Y-direction displacement measurement is completed directly;

5) when the X-direction displacement measurement and the Y-direction displacement measurement are both completed, the X-direction relative displacement of the rotor of the planar motor is calculated as $x=n_x \cdot \Delta x$, and the Y-direction relative displacement is calculated as $y=n_y \cdot \Delta y$; and 6) the steps 3) to 5) are repeated to enable the real-time measurement for the displacement of the rotor of the planar motor.

2. The method of claim 1, characterized in that, whether the X-direction displacement is generated and whether the X-direction displacement is forward or backward determined in the step 4) are performed as follows, if $$\left| \frac{B_{ksx}B_{cx} - B_{kcx}B_{sx}}{B_M^2} \right| \geq \Delta_x,$$

then the relative displacement of the rotor of the planar motor in the X-direction is $\Delta x$; and if not, then it is considered that the relative displacement in the X-direction is not generated by the rotor of the planar motor;

if $B_{ksx}B_{cx} - B_{kcx}B_{sx} \geq 0$, then the relative displacement of the rotor of the planar motor in the X-direction is in the forward direction; and if not, then the relative displacement of the rotor of the planar motor in the X-direction is in the backward direction.

3. The method of claim 1, characterized in that, whether the Y-direction displacement is generated and whether the Y-direction displacement is forward or backward determined in the step 4) are performed as follows, if $$\left| \frac{B_{ksy}B_{cy} - B_{kcy}B_{sy}}{B_M^2} \right| \geq \Delta_y,$$

then the relative displacement of the rotor of the planar motor in the Y-direction is $\Delta y$; and if not, then it is considered that the relative displacement in the Y-direction is not generated by the rotor of the planar motor;

if $B_{ksy}B_{cy} - B_{kcy}B_{sy} \geq 0$, then the relative displacement of the rotor of the planar motor in the Y-direction is in the forward direction; and if not, then the relative displacement of the rotor of the planar motor in the Y-direction is in the backward direction.

* * * * *